(12) United States Patent
Allen et al.

(10) Patent No.: US 12,459,416 B2
(45) Date of Patent: Nov. 4, 2025

(54) BUCKET SYSTEM FOR A VEHICLE TRAY

(71) Applicant: Jagano Pty Ltd, Victoria Park (AU)

(72) Inventors: Gavin John Allen, Victoria Park (AU);
Edward Joseph Khoury, Bateman (AU); Ross Stanley Khoury, Bateman (AU)

(73) Assignee: JAGANO PTY LTD, Victoria Park (AU)

( * ) Notice: Subject to any disclaimer, the term of this patent is extended or adjusted under 35 U.S.C. 154(b) by 588 days.

(21) Appl. No.: 17/800,090

(22) PCT Filed: Feb. 16, 2021

(86) PCT No.: PCT/AU2021/050131
§ 371 (c)(1),
(2) Date: Aug. 16, 2022

(87) PCT Pub. No.: WO2021/163754
PCT Pub. Date: Aug. 26, 2021

(65) Prior Publication Data
US 2023/0145943 A1    May 11, 2023

(30) Foreign Application Priority Data
Feb. 18, 2020    (AU) ................ 2020900456

(51) Int. Cl.
*B60P 1/32*        (2006.01)
*B60P 1/28*        (2006.01)
(Continued)

(52) U.S. Cl.
CPC ............. *B60P 1/32* (2013.01); *B60P 1/286* (2013.01); *B60P 1/52* (2013.01); *B60P 1/6427* (2013.01);
(Continued)

(58) Field of Classification Search
CPC .... B60P 1/32; B60P 1/286; B60P 1/52; B60P 3/40; B60P 1/003; B60P 1/6427; B62D 33/0273; B62D 33/03; B62D 33/0207
See application file for complete search history.

(56) References Cited

U.S. PATENT DOCUMENTS 3,004,678 A    10/1961    Golaski
4,647,110 A     3/1987    McKee
(Continued)

FOREIGN PATENT DOCUMENTS

CA    2149447 A1    11/1996
JP    2002357049 A  * 12/2002

OTHER PUBLICATIONS

Australian Patent Office International-Type Search Report for Australian Patent Application No. 2020900456 dated Feb. 18, 2020.

*Primary Examiner* — Daniel J Colilla
(74) *Attorney, Agent, or Firm* — TOPE-MCKAY & ASSOCIATES

(57) ABSTRACT

A bucket system (10) comprising a frame (12) including first and second rails (26, 27). A bucket (14) is provided having a bucket support (16) including front wheels (32, 33) and rear wheels (34, 35) being slidable within channels (30) in the first and second rails (26, 27). Rear portions (39) of the rails (26, 27) are pivotable between extended and stored positions. When the rear portions (39) are moved to the extended positions, gaps (42) are defined in upper sides of each of the rails (26, 27) such when the rear wheels (34, 35) are moved into the rear portions (39) of the first and second rails (26, 27), the front wheels (32, 33) may move upwardly through the gaps (42) to allow the bucket (14) to pivot about the rear wheels (34, 35).

16 Claims, 20 Drawing Sheets

(51) Int. Cl.
*B60P 1/52* (2006.01)
*B60P 1/64* (2006.01)
*B62D 33/02* (2006.01)
*B62D 33/027* (2006.01)

(52) U.S. Cl.
CPC ..... *B62D 33/0207* (2013.01); *B62D 33/0273* (2013.01)

(56) References Cited

U.S. PATENT DOCUMENTS

| | | |
|---|---|---|
| 5,931,632 A | 8/1999 | Dongilli et al. |
| 9,550,442 B2 | 1/2017 | Hanson, Jr. |
| 2010/0171338 A1* | 7/2010 | Tamura ................... B60R 5/04 296/184.1 |
| 2013/0221729 A1* | 8/2013 | Irwin ....................... B60P 1/24 298/19 R |
| 2015/0251709 A1 | 9/2015 | Moorman |
| 2016/0068091 A1* | 3/2016 | Ferkul ..................... B60P 1/003 298/12 |
| 2020/0114798 A1* | 4/2020 | Medina ................ B62D 63/064 |

* cited by examiner

BUCKET SYSTEM FOR A VEHICLE TRAY

FIELD OF THE INVENTION

The present invention relates to a bucket system for use within the tray of a vehicle.

BACKGROUND TO THE INVENTION

Vehicles having rear trays are used for transporting a wide variety of loads. While larger commercial versions of such vehicles may include the option of a tray which can be mechanically tipped, many smaller commercial and personal vehicles include only a fixed tray. When transporting material such as sand or soil, it is therefore generally necessary to shovel the material out of the tray.

The present invention relates to a bucket system which may be used within the tray of such vehicles. The bucket system is provided in a form which is easy to use and fit to existing vehicles and which is of relatively simple and inexpensive construction. The bucket system provides for easy movement of the bucket to a position where it is clear from the vehicle so that it may be easily tipped.

SUMMARY OF THE INVENTION

According to one aspect of the present invention there is provided a bucket system comprising:
  a frame including first and second rails, the first and second rails each including a front portion and a rear portion, the front portions being secured relative to a floor of a tray of a vehicle and the rear portions being pivotable between an extended position, in which the rear portions are parallel to the front portions, and a stored position, in which the rear portions are perpendicular to the front portions; and
  a bucket having a bucket support, the bucket support including first and second front wheels and first and second rear wheels, the first front and rear wheels being slidable within a channel extending along the first rail and the second front and rear wheels being slidable within a channel extending along the second rail;
wherein when the rear portions of the first and second rails are moved to the extended positions, a gap is defined in an upper side of each of the first and second channels such when the first and second rear wheels are moved into the first and second channels in the rear portions of the first and second rails, the first and second front wheels may move upwardly through the gaps to allow the bucket to pivot about the first and second rear wheels.

Preferably rear ends of the front portions and front ends of the rear portions of the first and second rails are angled such that the front ends of the rear portions engage with the rear ends of the front portions when the rear portions are in the stored position and define the gaps in the extended position.

Preferably the rear ends of front portions and front ends of the rear portions are angled at 45° such that the front ends of the rear portions engage with the rear ends of the front portions when the rear portions are in the stored position.

Preferably the front and rear portions of the side rails are connected together by hinges on lower sides thereof.

Preferably the first and second rails comprises C-shaped members such that the channels are provided in vertical sides of the first and second rails and upper and lower sides of the channels are closed such that the wheels may engage against inner surfaces of the upper and lower sides of the channels.

In a preferred embodiment, the channels are provided in outer sides of the first and second rails.

Preferably the channels in the first and second rails are closed at the rear ends.

Preferably the centre of gravity of the bucket is located rearwardly of the centre of the bucket support such that the bucket tends to tip rearwardly when the front wheels are located adjacent the gap.

Preferably the bucket comprises a base wall and an edge wall extending upwardly from around the periphery of the base wall.

Preferably the base wall is rectangular in shape and the edge wall comprises front and rear walls and first and second side walls.

In a preferred embodiment, the first and second side walls and the front wall are perpendicular to the base wall and the rear wall is angled outwardly away from the base.

Preferably the bucket support includes a first side member located adjacent the first side wall and a second side member located adjacent the second side wall, the first side member including the first front and rear wheels and the second side member including the second front and rear wheels.

Preferably of the first and second side members includes downturned end portions on which the wheels are mounted.

Preferably the first and second side members are mounted generally between midpoints of the first and second side walls and the front wall.

Preferably resilient buffers are provided on the bucket support adjacent a rear side thereof such that the buffers engage with an edge of a tray door of the vehicle when the bucket is tipped to restrict further rotation of the bucket

BRIEF DESCRIPTION OF THE DRAWINGS

The invention will now be described, by way of example, with reference to the following drawings, in which.

DETAILED DESCRIPTION OF PREFERRED EMBODIMENTS

Figure 1:
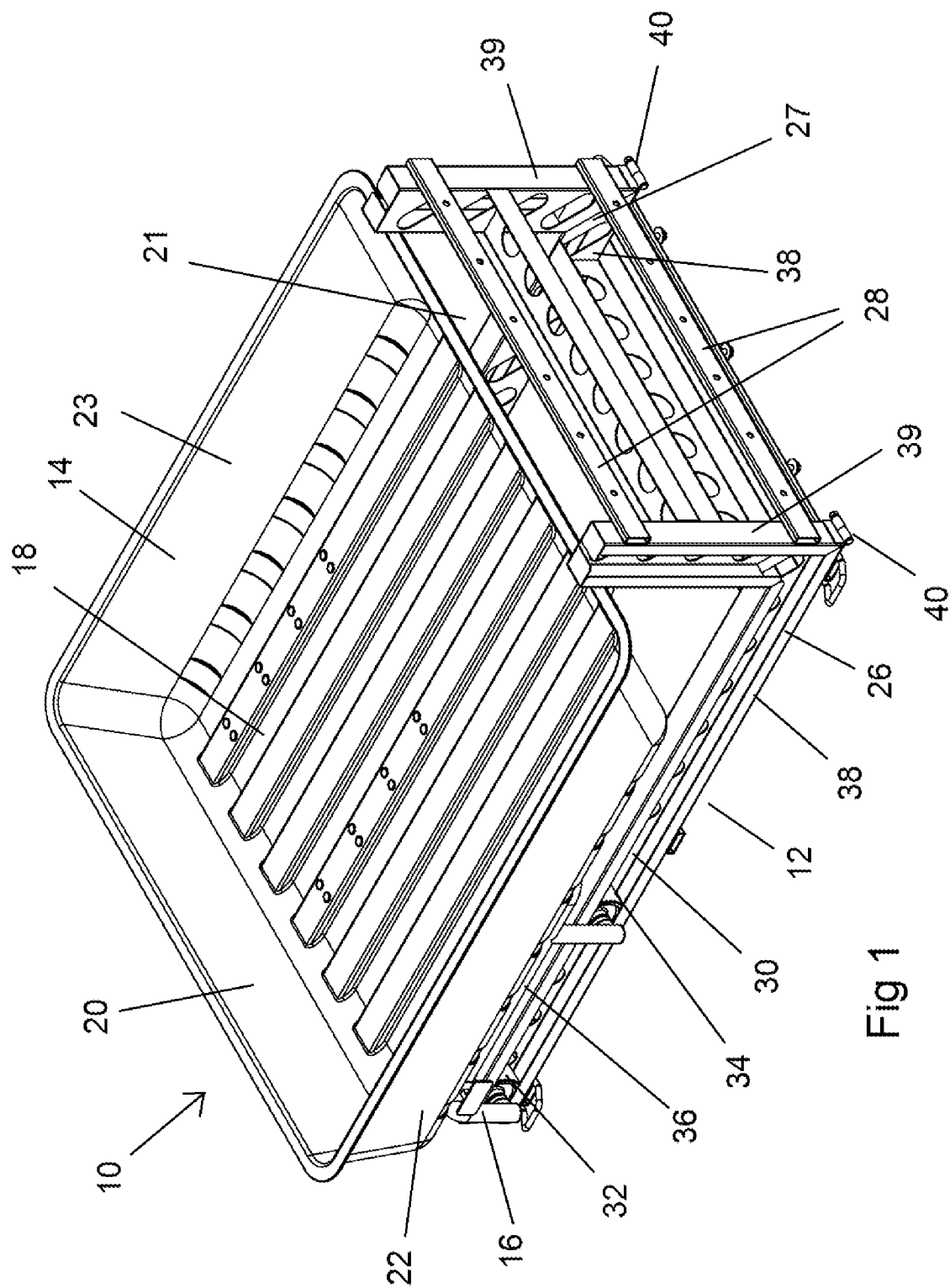
FIG. 1 is an upper perspective view of a bucket system in accordance with the present invention.
Figure 2:
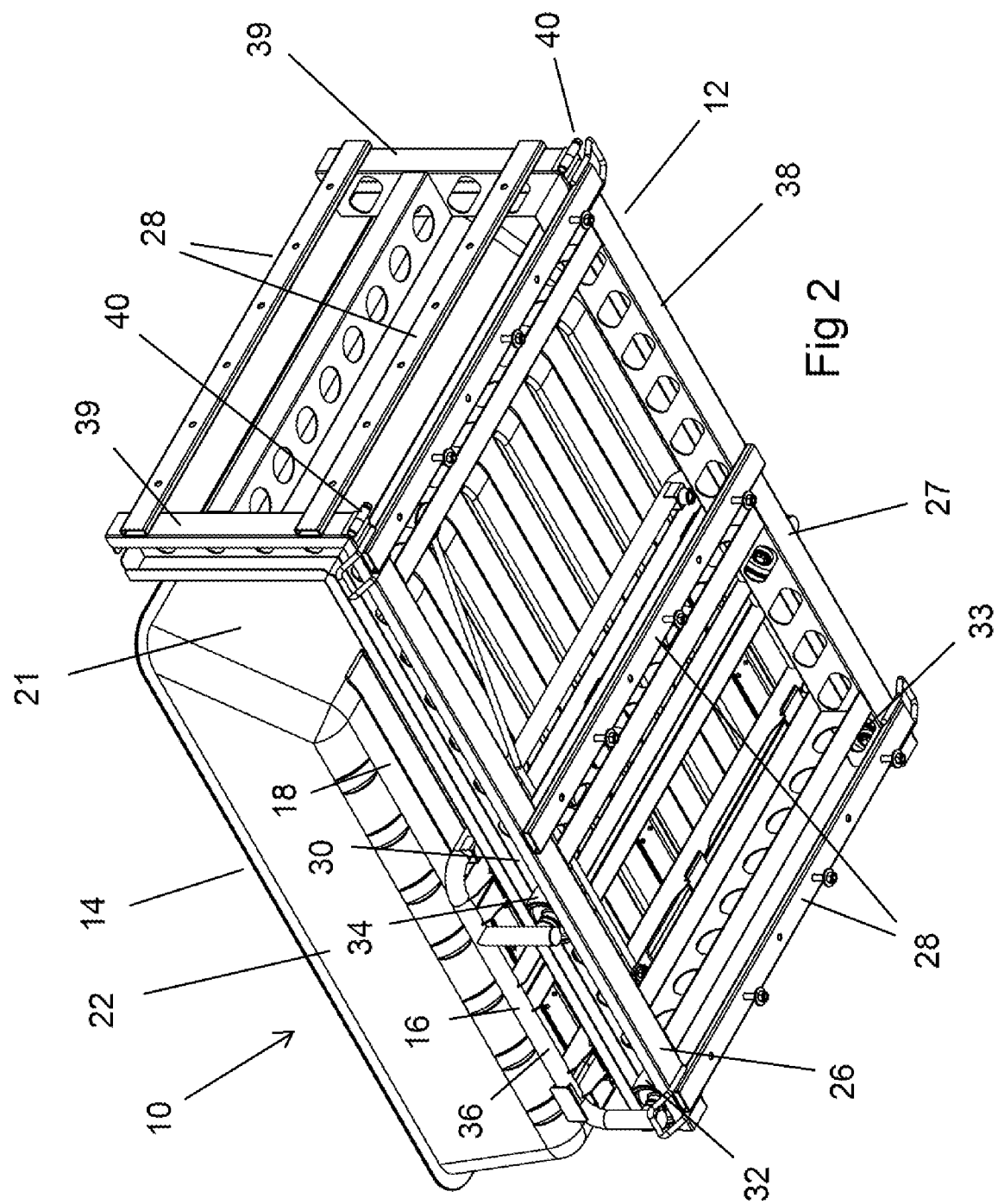
FIG. 2 is a lower perspective view of the bucket system of FIG. 1.
Figure 3:
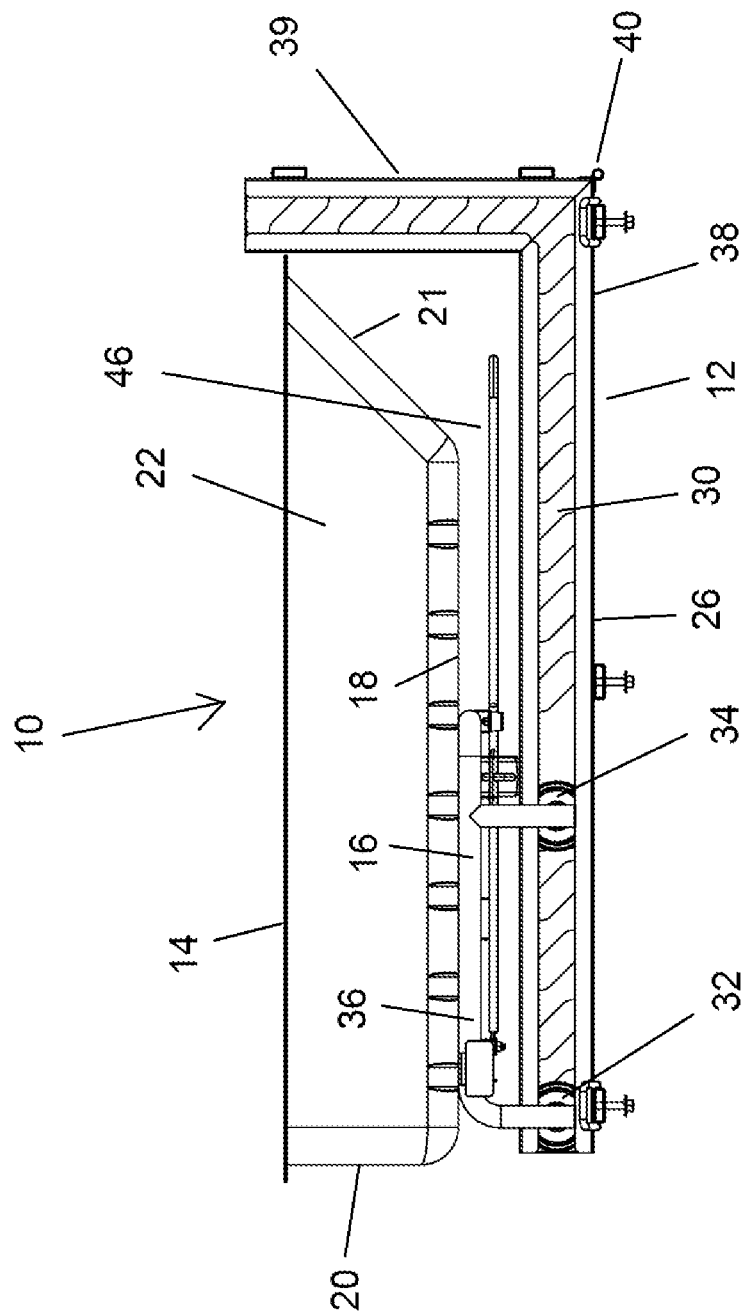
FIG. 3 is a side view of the bucket system of FIG. 1.
Figure 4:
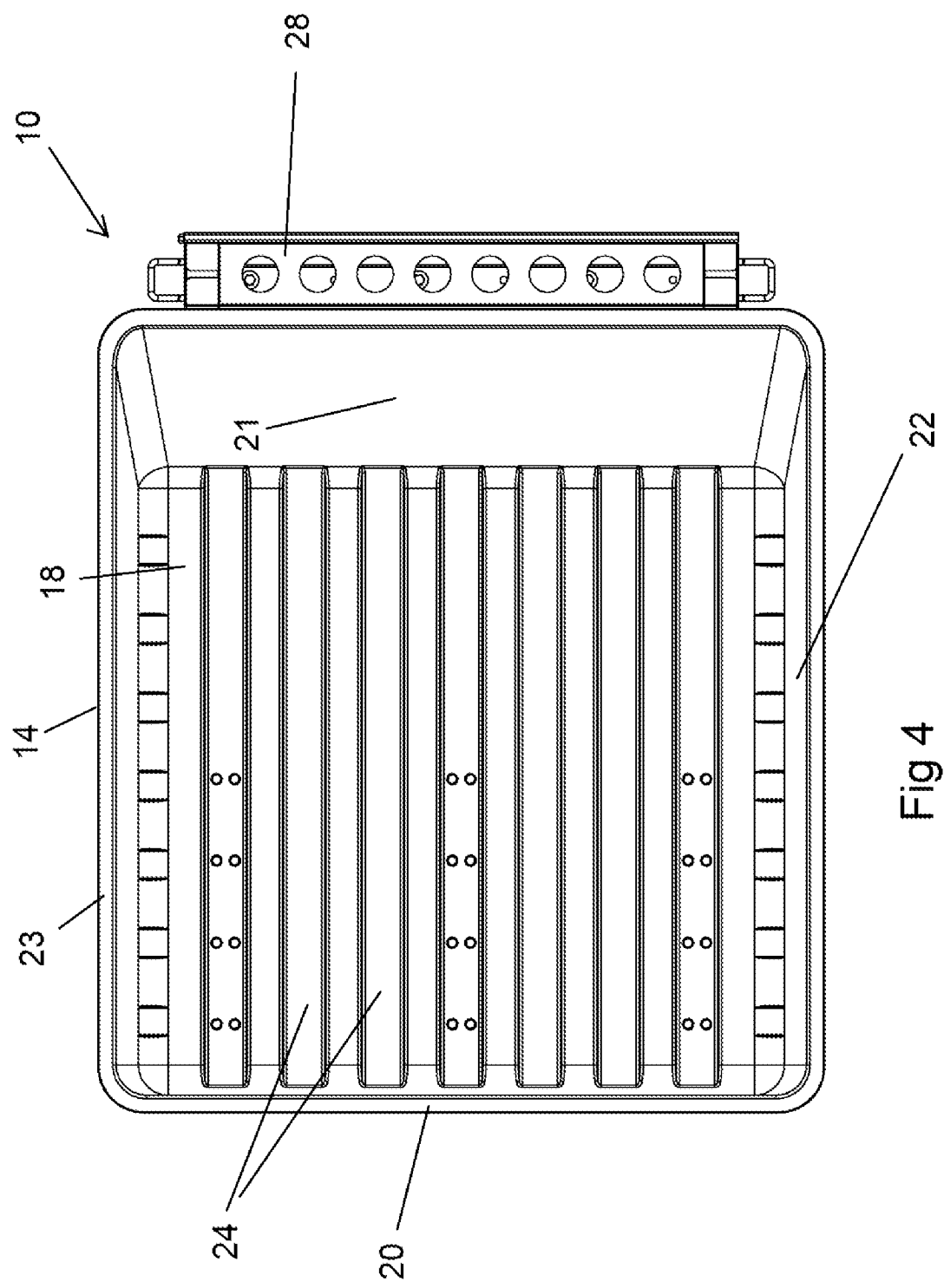
FIG. 4 is a top view of the bucket system of FIG. 1.
Figure 5:
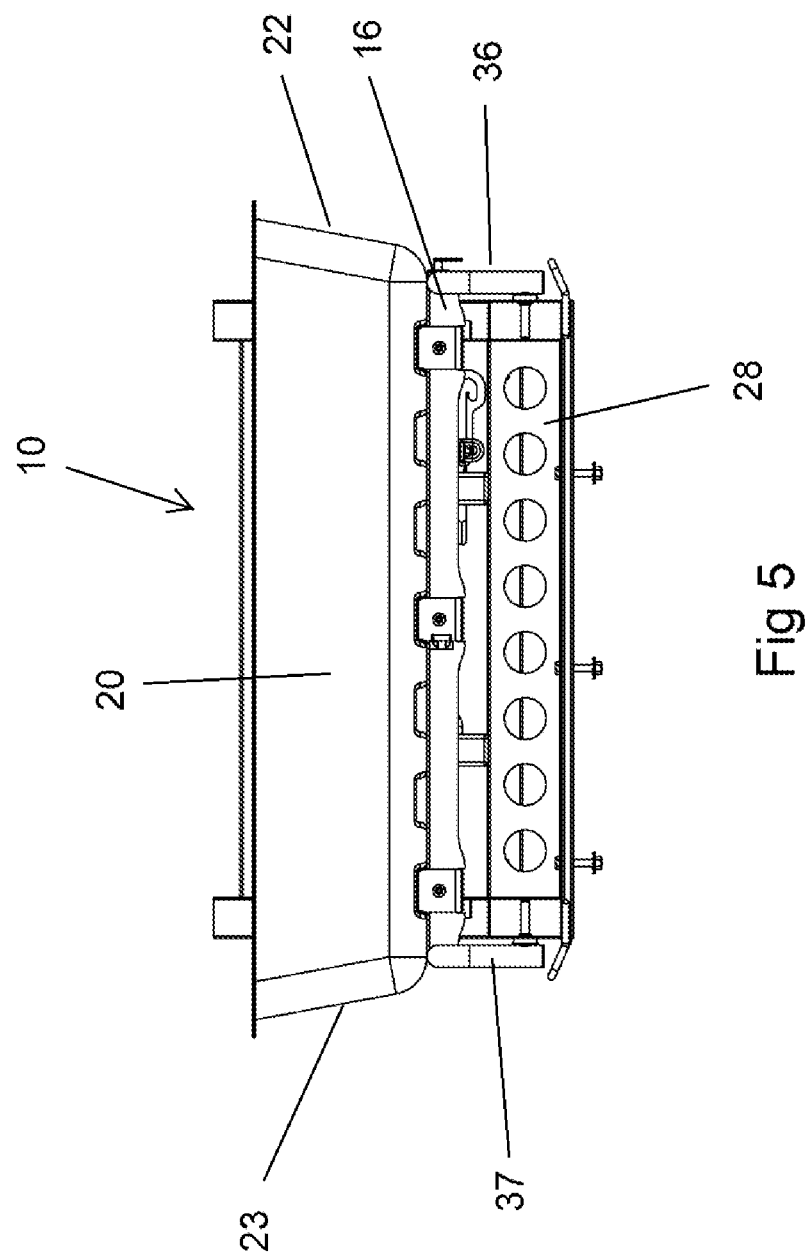
FIG. 5 is a front view of the bucket system of FIG. 1.
Figure 6:
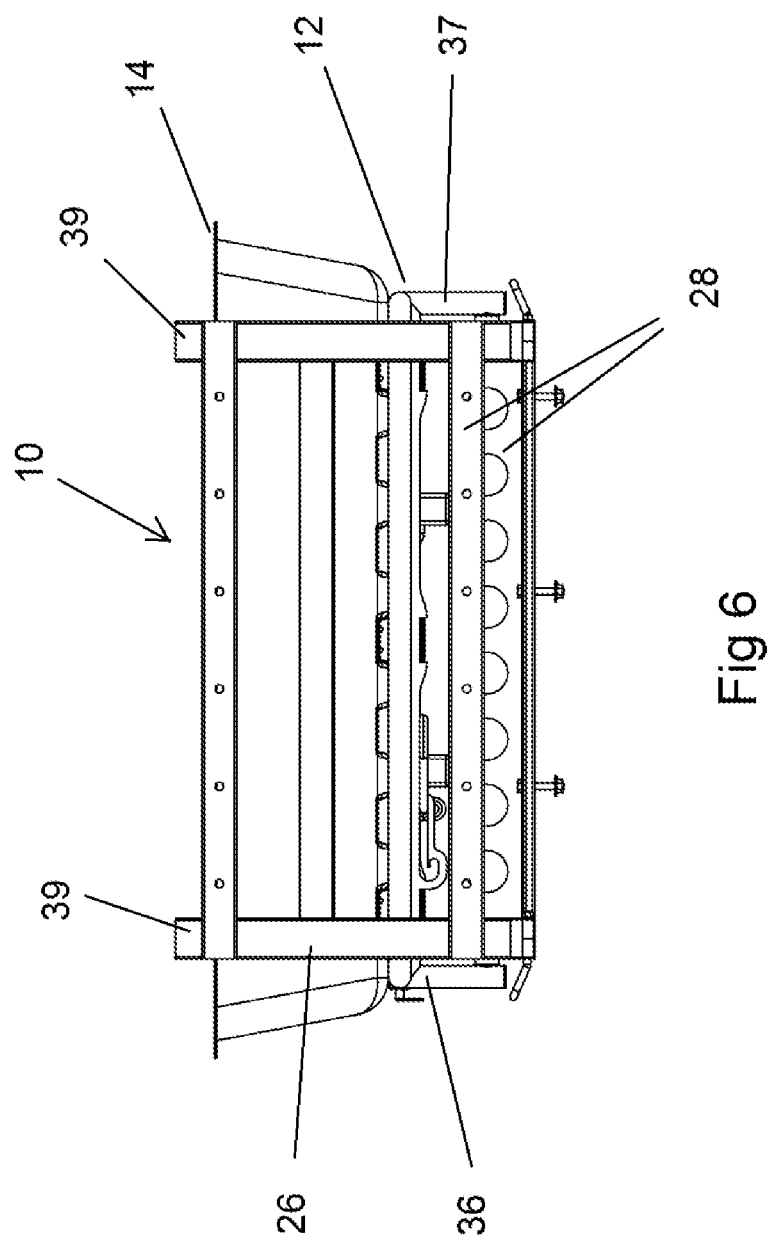
FIG. 6 is a rear view of the bucket system of FIG. 1.

Referring to the Figures, there is shown a bucket system 10 comprising generally a frame 12 and a bucket 14. The bucket system 10 is for use within a tray 11 of a vehicle 13. The frame 12 of the bucket system 10 is to be mounted adjacent a floor 15 of the tray 11 of the vehicle 13.

The bucket 14 comprises generally an open topped receptacle defined by a base wall 18 and an edge wall extending upwardly from around the periphery of the base wall 18. The base wall 18 is rectangular in shape to generally match the shape of the floor 15 of the tray 11 and the edge wall therefore comprises front and rear walls 20 and 21 and first and second side walls 22 and 23. References to front and rear relate generally to the sides of the bucket system 10 located closest to the front and rear of the vehicle 13 respectively.

The bucket 14 is formed from any suitable material, such as a suitable plastic or fibreglass based material. The base wall 18 includes a plurality of parallel ribs 24 to provide additional strength to the base wall 18 of the bucket 14. The first and second side walls 22 and 23 and the front wall 20 are generally perpendicular to the base wall 18 while the rear wall 21 is angled outwardly away from the base wall 18 to allow material within the bucket 14 to more easily slide outwardly from the bucket 14, when the bucket 14 is tipped.

The frame 12 comprises a first rail 26, a second rail 27 and a plurality of cross members 28 extending between the first and second rails 26 and 27. The first and second rails 26 and 27 are parallel to each other and the cross members 28 extend transversely between the first and second rails 26 and 27. The first rail 26 is to be mounted in use adjacent a first side of the tray 11 and the second rail 27 is to be mounted adjacent a second opposite side of the tray 11.

Each of the first and second rails 26 and 27 includes a longitudinal channel 30 extending from a front to a rear end. The channel 30 in the first rail 26 is provided in an outer side of the first rail 26, being a side opposite the second rail 27. The channel 30 in the second rail 27 is provided in an outer side of the second rail 27, being the side opposite the first rail 26. That is, the channels 30 are provided in vertical sides of the first and second rails 26 and 27, with upper and lower sides of the channels 30 being closed. Each of the first and second rails 26 and 27 are formed in the embodiment shown from a generally C-shaped beam of a suitable material, such as a metallic material.

The bucket 14 is provided with a bucket support 16 mounted to a lower side of the base wall 18. The bucket support 16 engages with the frame 12 to support the bucket 14 above the frame 12. The bucket support 16 includes first and second front wheels 32 and 33 and first and second rear wheels 34 and 35. The first front and rear wheels 32 and 34 are provided on the bucket support 16 adjacent the first side wall 22 such that the first front and rear wheels 32 and 34 may be received within the channel 30 in the first rail 26. The second front and rear wheels 33 and 35 are provided on the bucket support 16 adjacent the second side wall 23 such that the second front and rear wheels 33 and 35 may be received within the channel 30 in the second rail 27. Rear ends of the channels 30 in the first and second rails 26 and 27 are closed such that the rear wheels 34, 35 may not move past the rear ends of the first and second rails 26 and 27.

The bucket support 16 in the embodiment shown includes a first side member 36 and a second side member 37. The first side member 36 comprises an elongate member mounted adjacent a junction of the first side wall 22 and the base wall 18. The first side member 36 includes downturned end portions at opposed ends thereof on which are mounted the first front and rear wheels 32 and 34. The second side member 37 comprises also an elongate member mounted adjacent a junction of the second side wall 23 and the base wall 18. The second side member 37 includes also downturned end portions at opposed ends thereof on which are mounted the second front and rear wheels 33 and 35. The first and second side members 36 and 37 are connected by a plurality of transverse support members 44 which is connected to the lower side of the base wall 18 of the bucket 14.

The first and second side members 36 and 37 are each mounted generally between midpoints of the first and second side walls 22 and 23 and the front wall 20. The bucket 14 therefore extends further outwardly from the bucket support 16 on the rear side of the bucket 14. When the bucket 14 is filled evenly, the weight within the bucket 14 therefore provides a force tending to rotate the bucket 14 about the frame 12 such that the rear end of the bucket 14 tilts downwardly. Due to the shape of the channels 30 within the rails, the first and second front wheels 32 and 33 would be expected to engage against inner upper surfaces of the channels 30 under load, while the first and second rear wheels 34 and 35 would engage against the lower surfaces of the channels 30.

Each of the first and second rails 26 and 27 includes a front portion 38 and a rear portion 39. The front portion 38 of each of the first and second rails 26 and 27 is dimensioned to extend generally along the length of the floor 15 of the tray 11 of the vehicle 13. The rear portions 39 of each of the first and second rails 26 and 27 are relatively short such that the lengths of the rear portions 39 are similar to the height of a tray door 17 of the tray 11.

Figure 8:
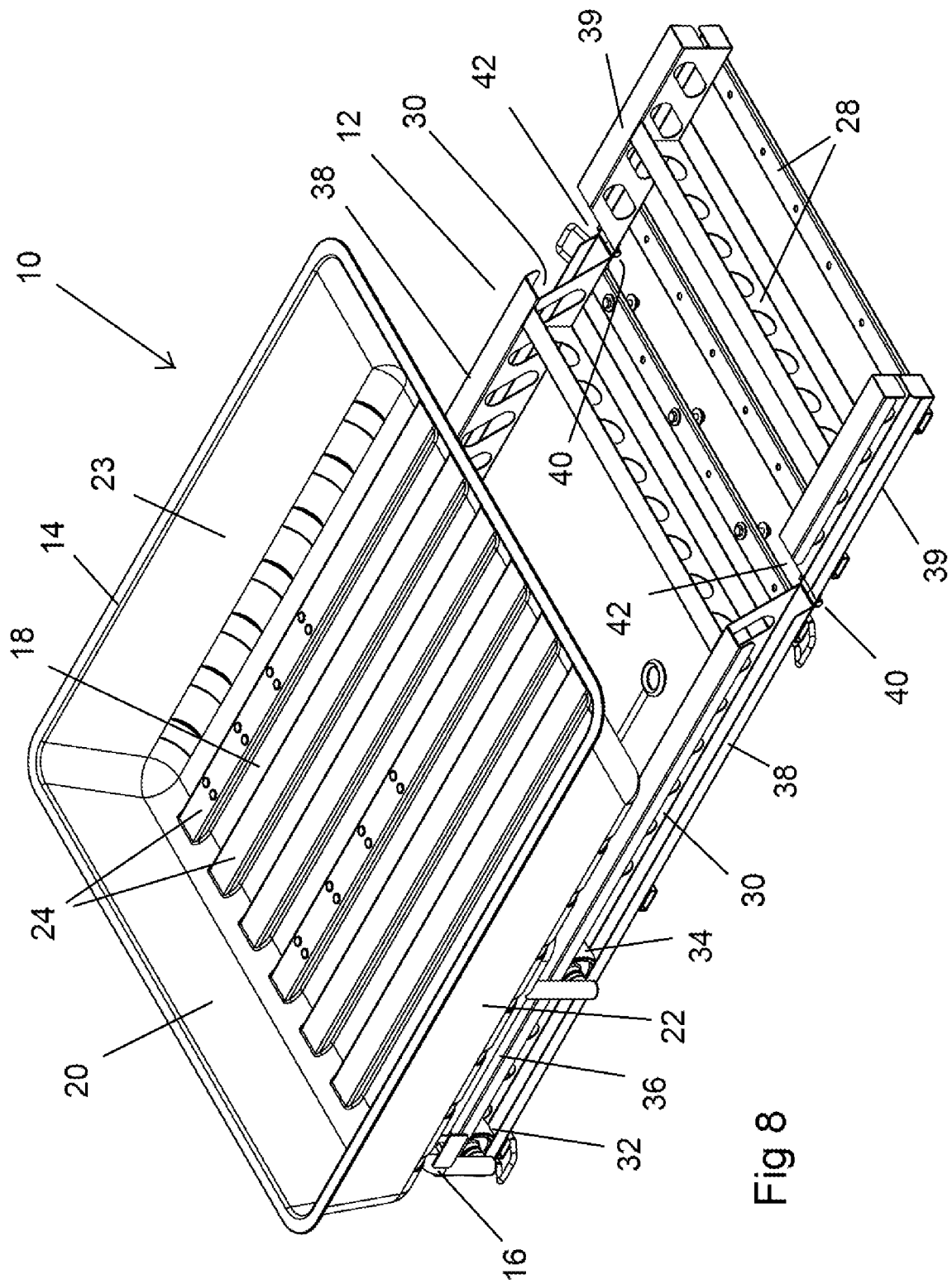
FIG. 8 is an upper perspective view of the bucket system with the rear portions of the first and second rails in the extended position.
Figure 9:
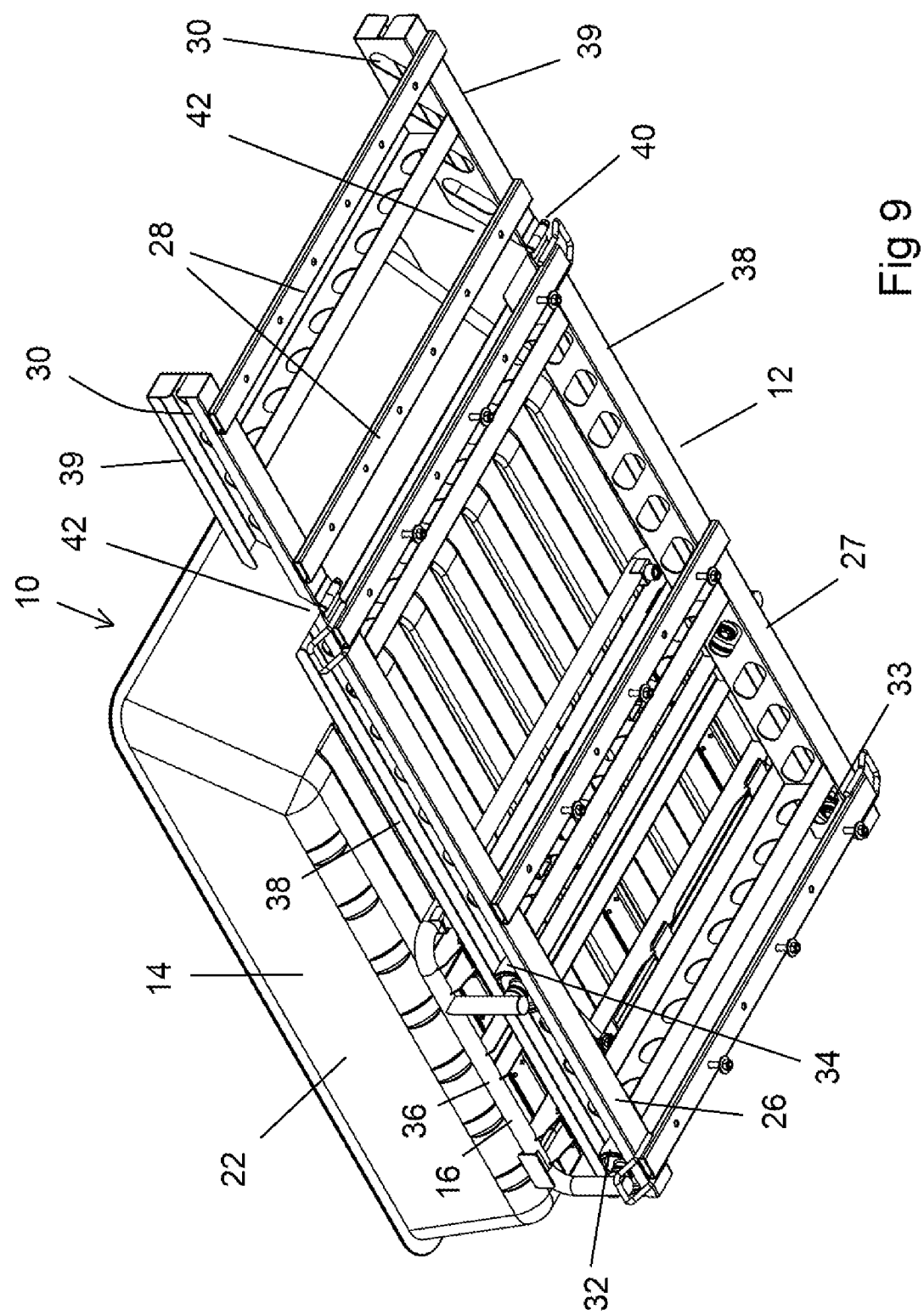
FIG. 9 is a lower perspective view of the bucket system with the rear portions of the first and second rails in the extended position.
Figure 10:
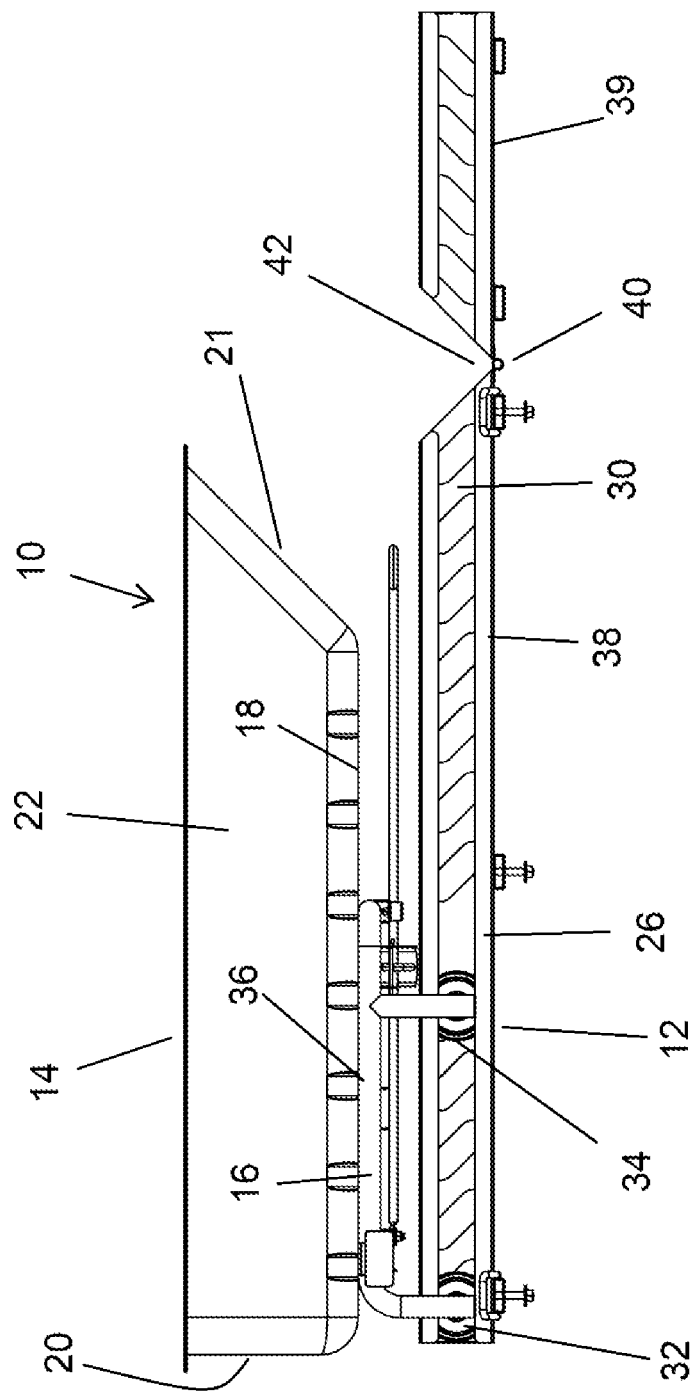
FIG. 10 is a side view of the bucket system with the rear portions of the first and second rails in the extended position.
Figure 11:
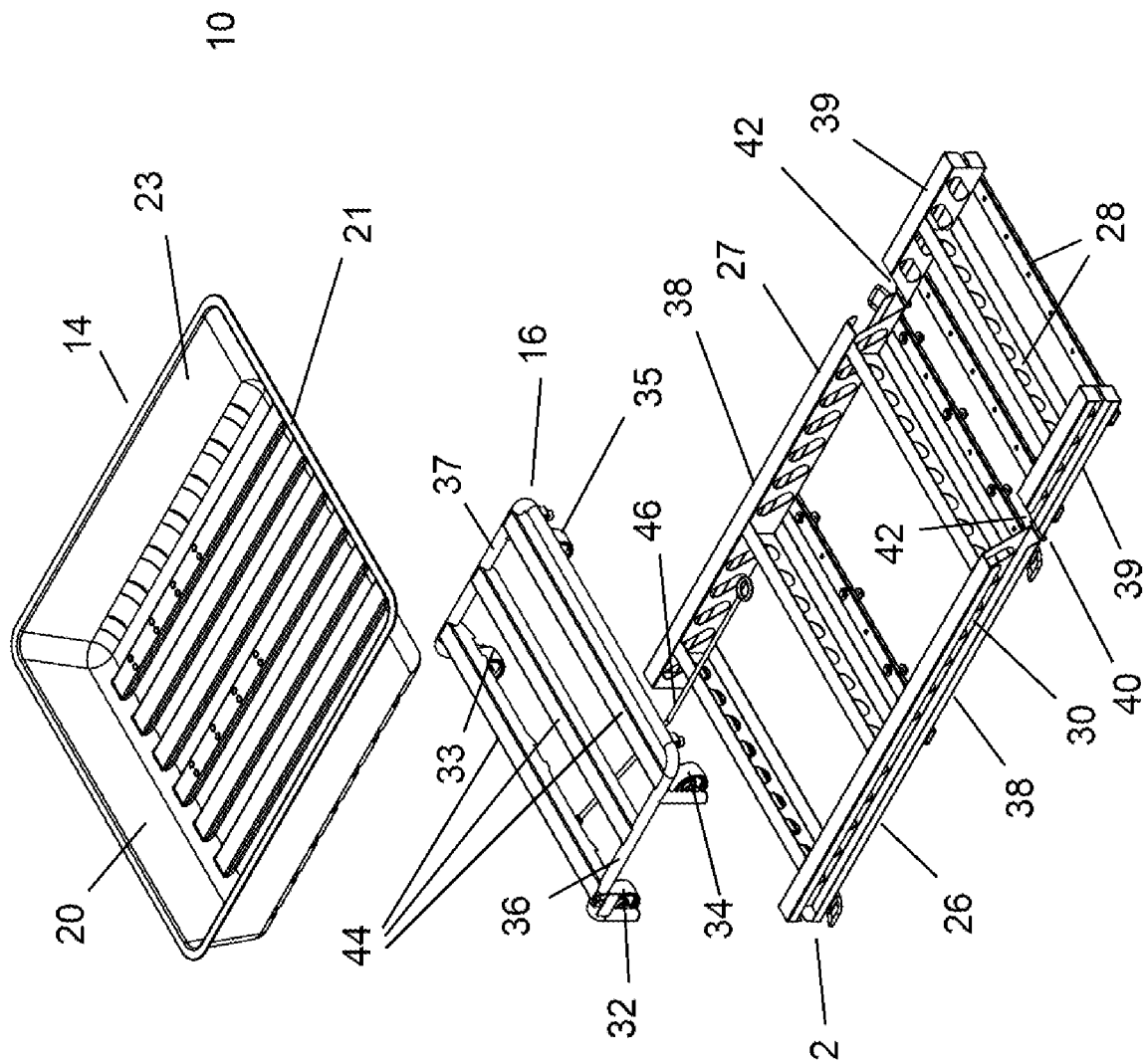
FIG. 11 is an upper perspective view showing the bucket sliding rearwardly within the first and second rails.
Figure 12:
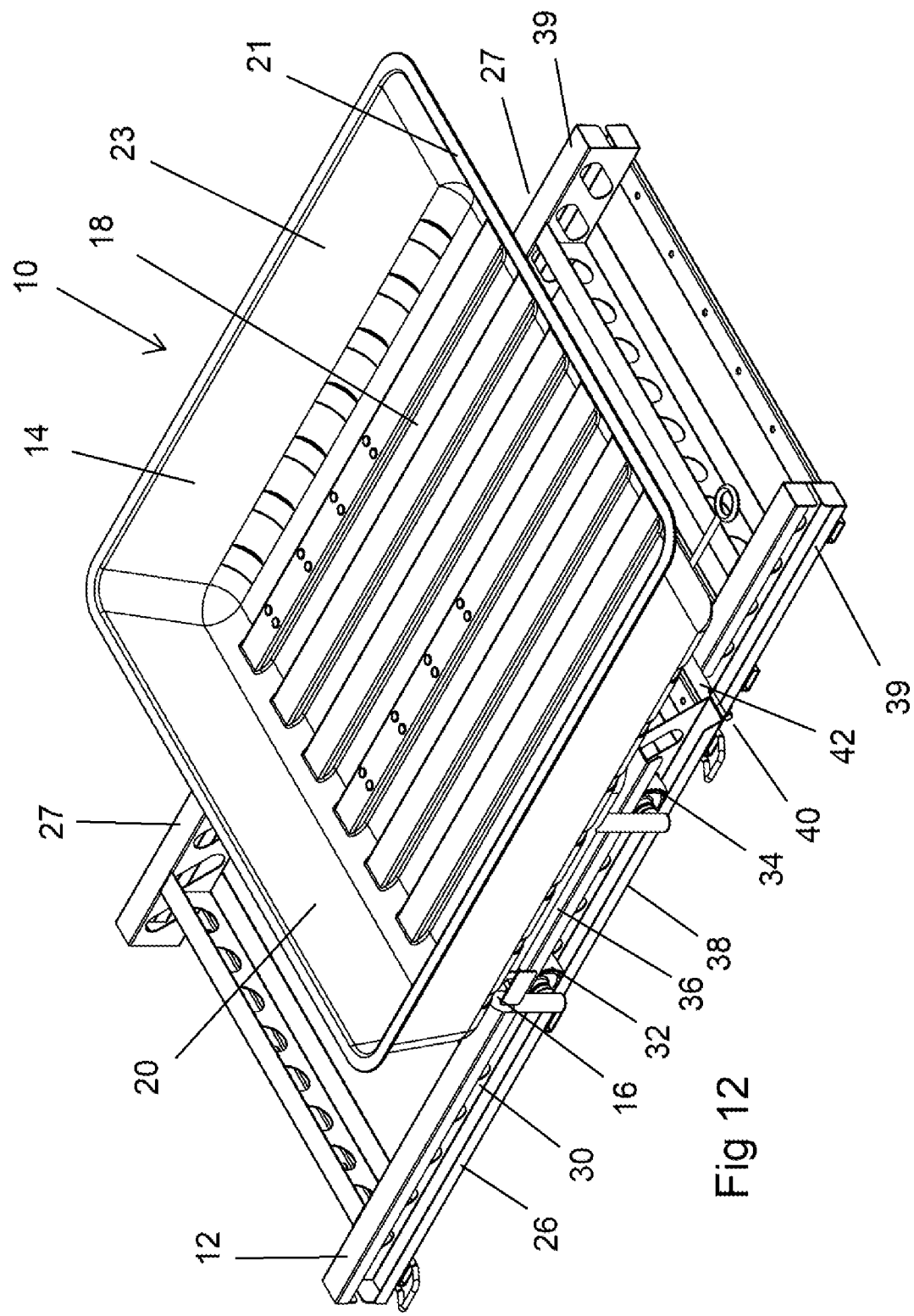
FIG. 12 is a lower perspective view showing the bucket sliding rearwardly.

Front ends of the rear portions 39 of the first and second rails 26 and 27 are pivotally connected to rear ends of the front portions 38 of the first and second rails 26 and 27. The rear portions 39 of the first and second rails 26 and 27 are thereby each pivotable between an extended position (as can be seen for example in FIG. 8) and a stored position (as can be seen for example in FIG. 1). In the extended position, the rear portions 39 of the first and second rails 26 and 27 are parallel and colinear with the front portions 38. In the stored position, the rear portions 39 of the first and second rails 26 and 27 are generally perpendicular to the front portions 38.

In the extended position, the rear portions 39 of the first and second rails 26 and 27 extend outwardly above the tray door 17 when open, and the first and second rear wheels 34 and 35 may be slid along the channel 30 into the rear portions 39 of the first and second rails 26 and 27. In the stored position, the rear portions 39 of the first and second rails 26 and 27 are located adjacent and parallel to an inner surface of the tray door 17 in the closed position.

The rear portions 39 and the front portions 38 of the first and second rails 26 and 27 are pivotally connected by hinges 40. The hinges 40 join lower sides of the front and rear portions 38 and 39 of the first and second rails 26 and 27. Rear ends of the front portions 38 and front ends of the rear portions 39 of the first and second rails 26 and 27 are angled. In the embodiment shown, with the rear portions 39 pivoting through 90°, the rear ends of front portions 38 and front ends of the rear portions 39 are angled at 45° such that the front ends of the rear portions 39 engage with the rear ends of the front portions 38 when the rear portions 39 are in the stored position.

Figure 13:
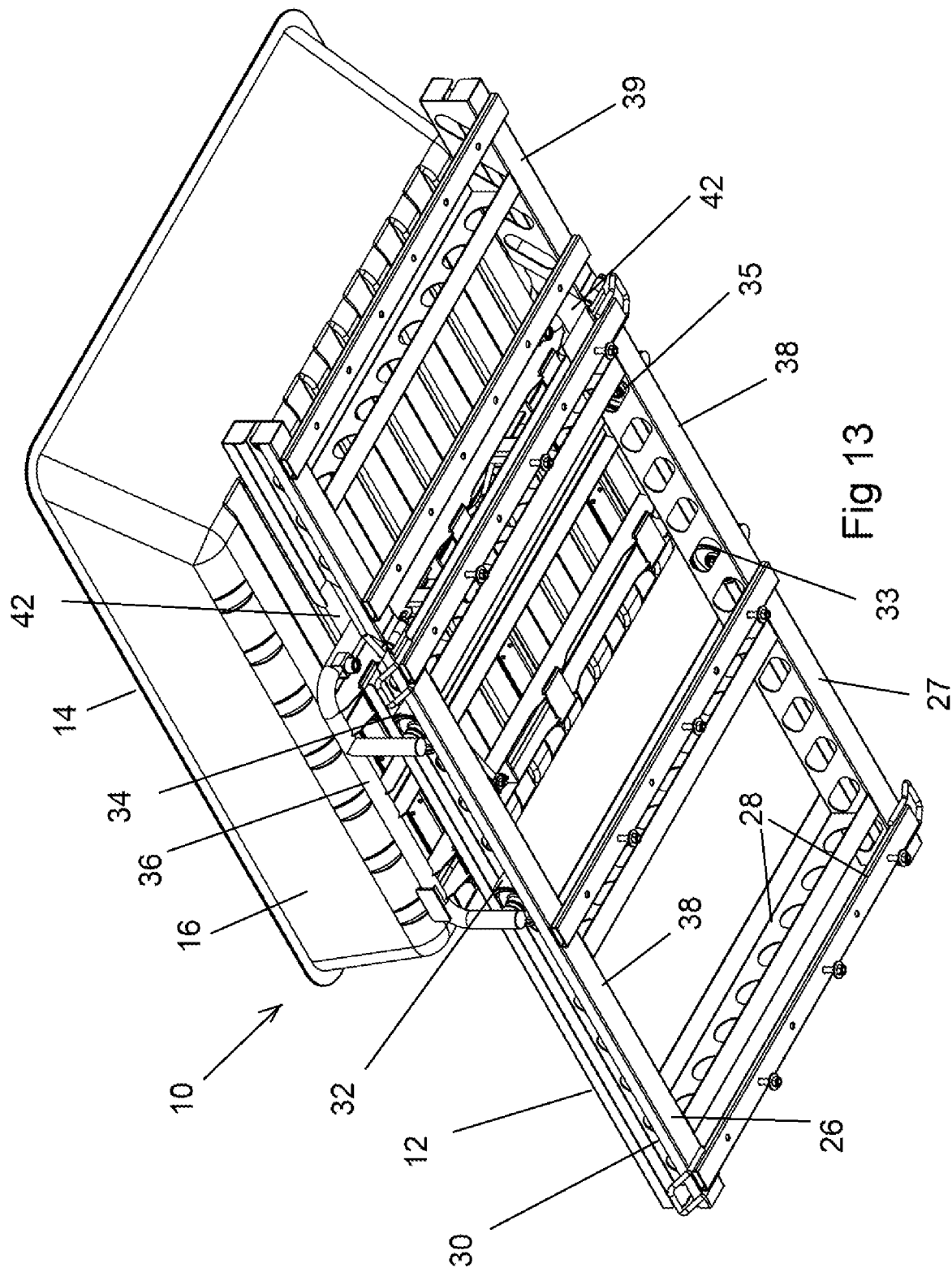
FIG. 13 is an upper perspective view showing tipping of the bucket.
Figure 14:
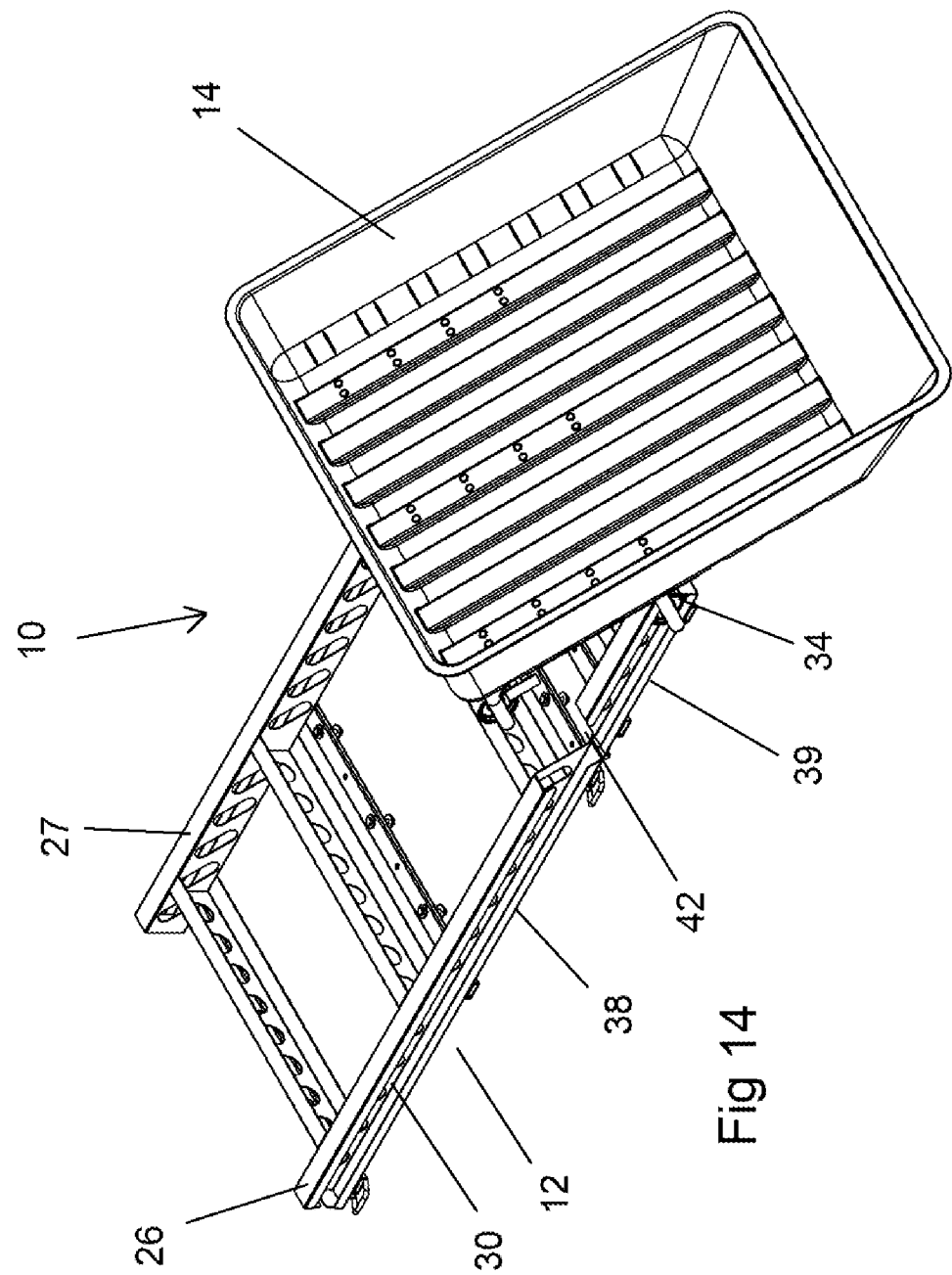
FIG. 14 is a lower perspective view showing tipping of the bucket.
Figure 15:
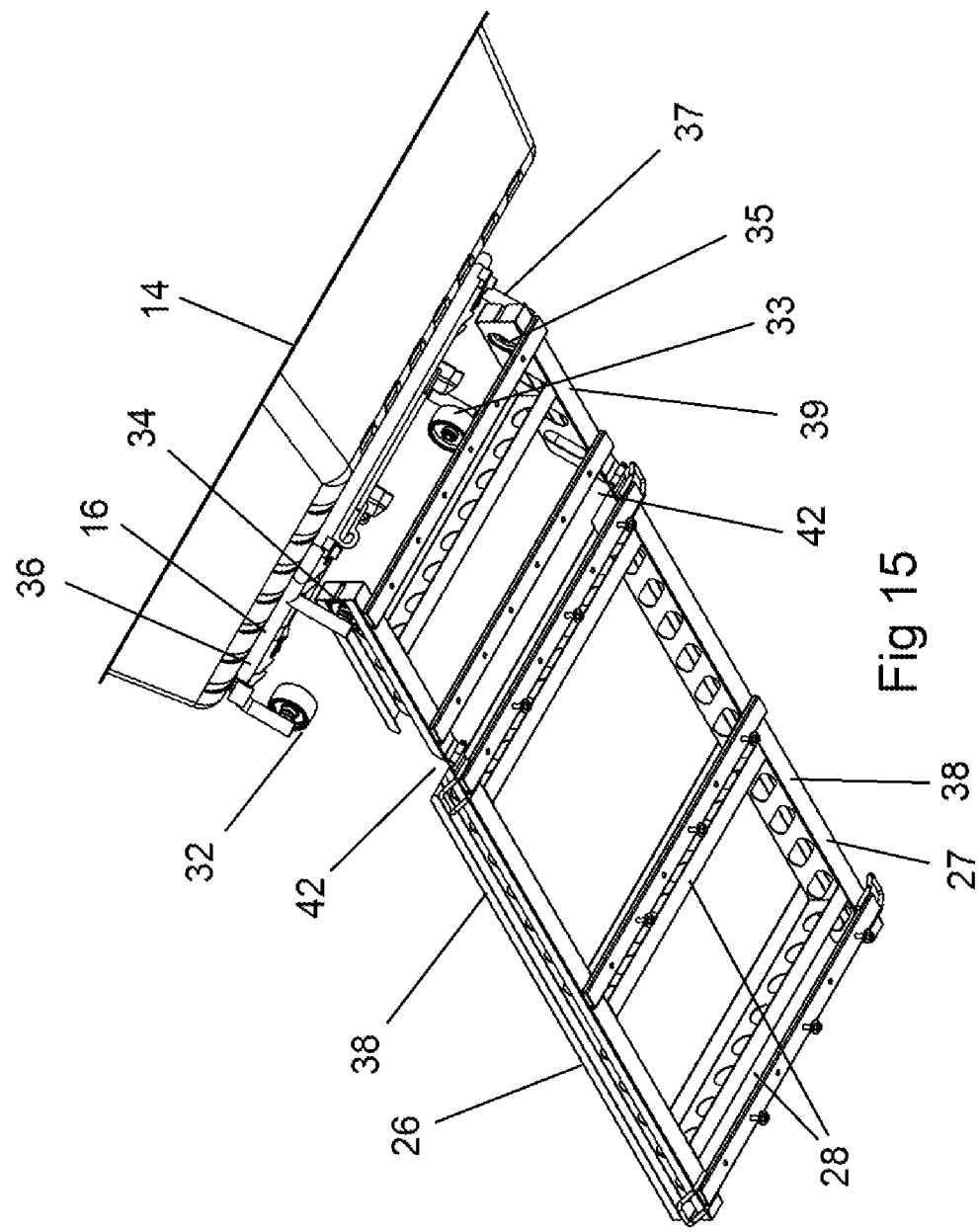
FIG. 15 is a side view showing tipping of the bucket.
Figure 16:
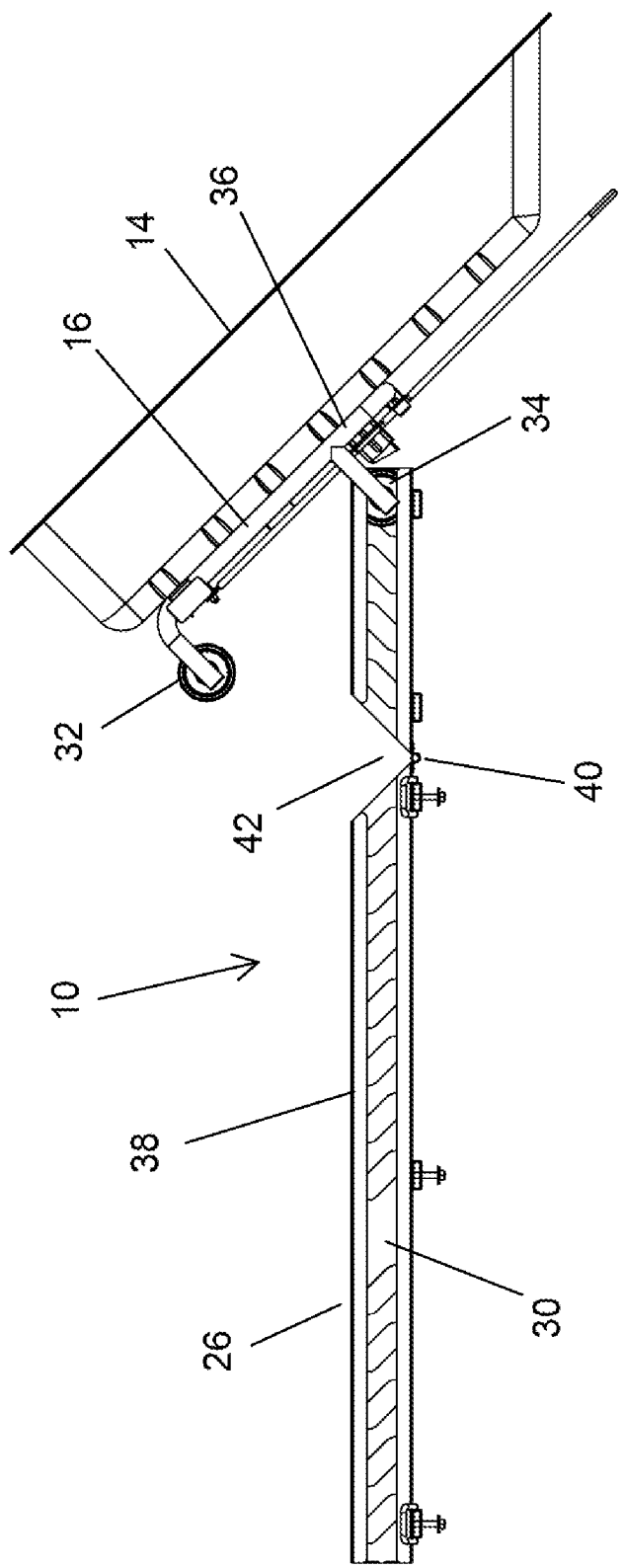
FIG. 16 is an upper perspective view of the bucket system showing the bucket in a stored position.

When the rear portions 39 are in the extended positions, the angled ends form gaps 42 in upper sides of the channels 30. The bucket support 14 is arranged such that when the first and second rear wheels 34 and 35 are slid outwardly into the rear portions 39 of the first and second rails 26 and 27, the first and second front wheels 32 and 33 are located adjacent the gaps 42 in the upper sides of the channels 30. As the rear end of the bucket 14 moves outwardly beyond the rear end of the first and second rails 26 and 27, the first and second front wheels 32 and 33 are therefore free to move upwardly through the gaps 42. With the centre of gravity of the bucket 14 located rearwardly of the centre of the bucket support 16, the bucket 14 will tilt as shown in FIGS. 13 to 15, with the first and second front wheels 32 and 33 moving upwardly through the gaps 42 to disengage from the first and second rails 26 and 27.

Figure 18:
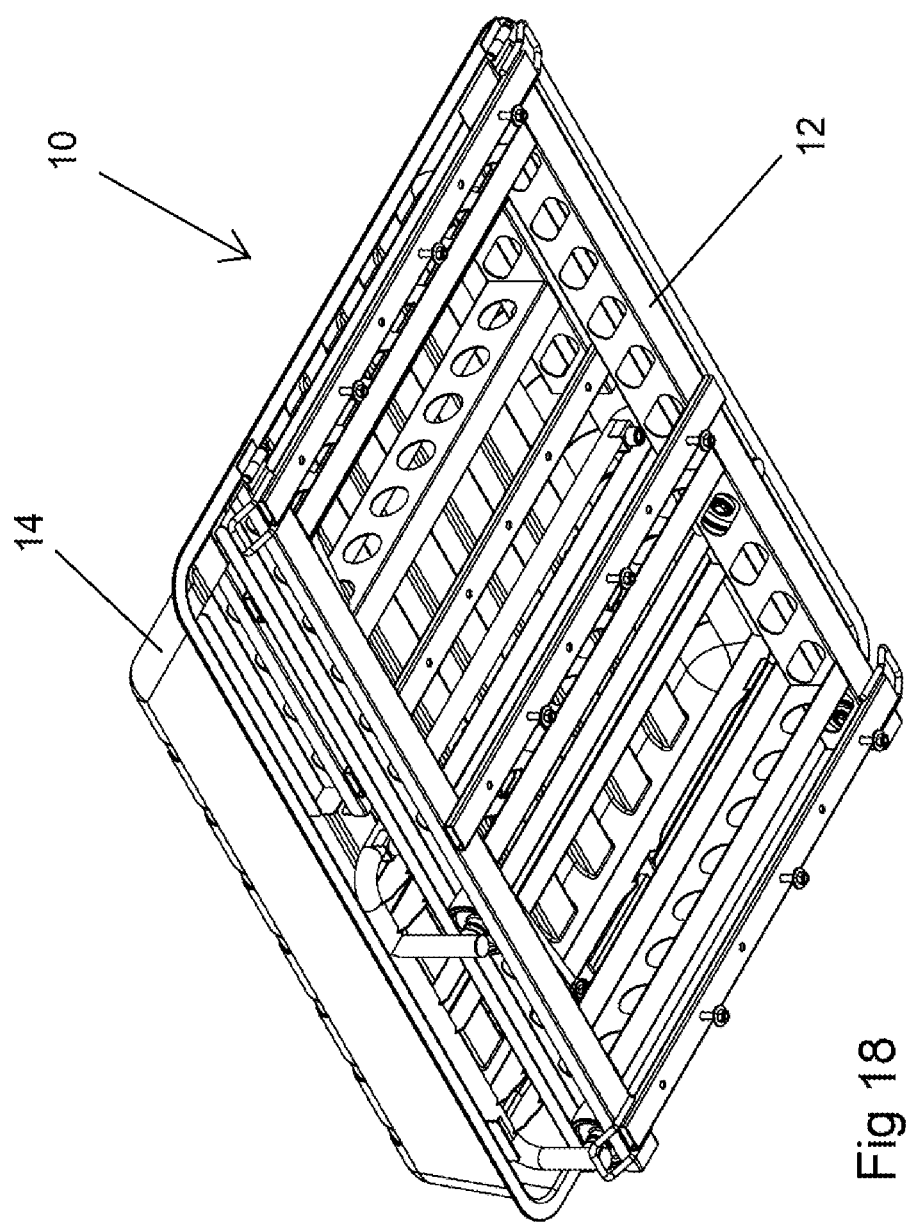
FIG. 18 is an upper perspective view of a vehicle with the bucket system fitted into the tray.
Figure 19:
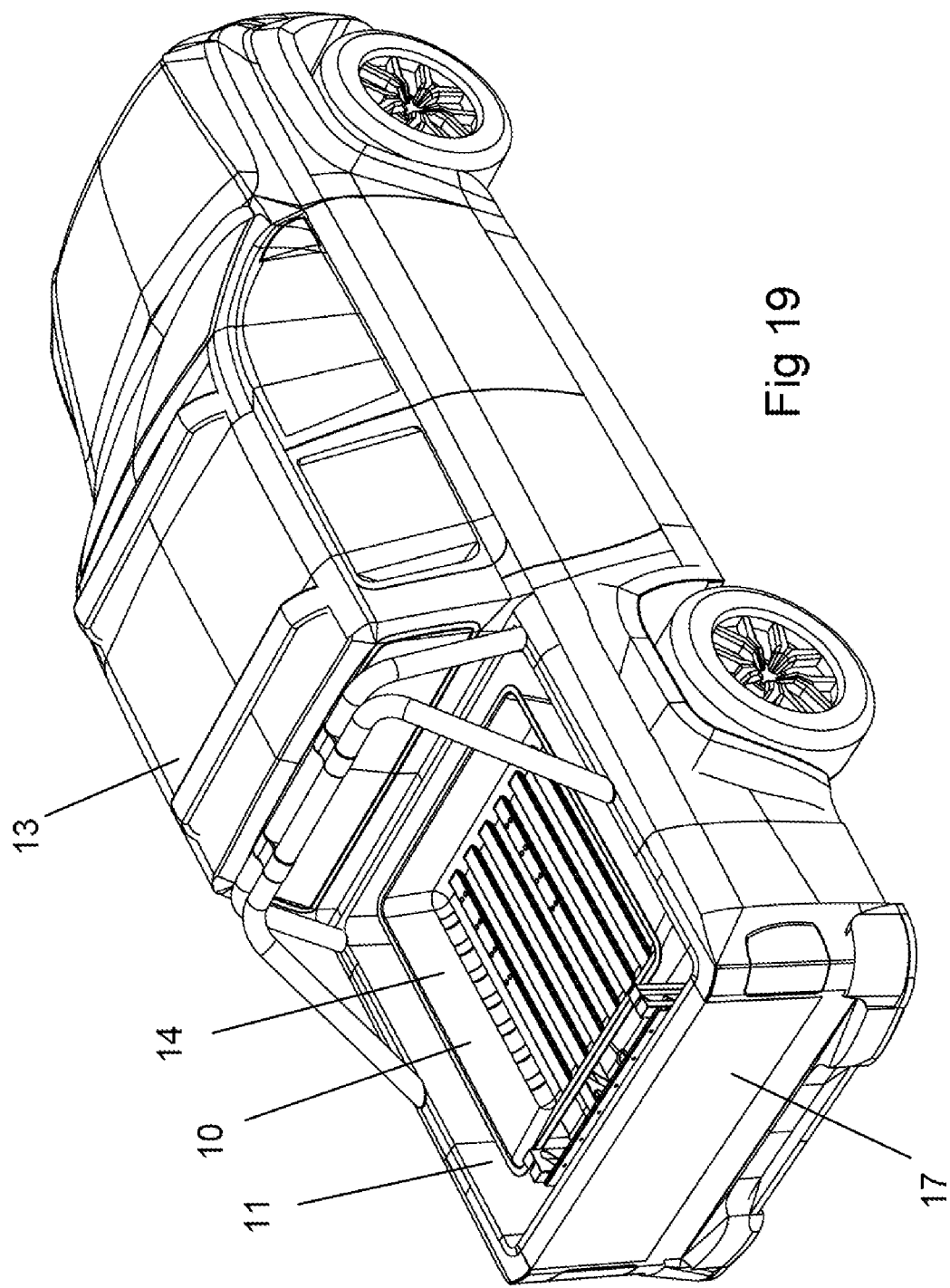
FIG. 19 is an upper perspective view of the vehicle showing the bucket system with the bucket in the tipped position.
Figure 20:
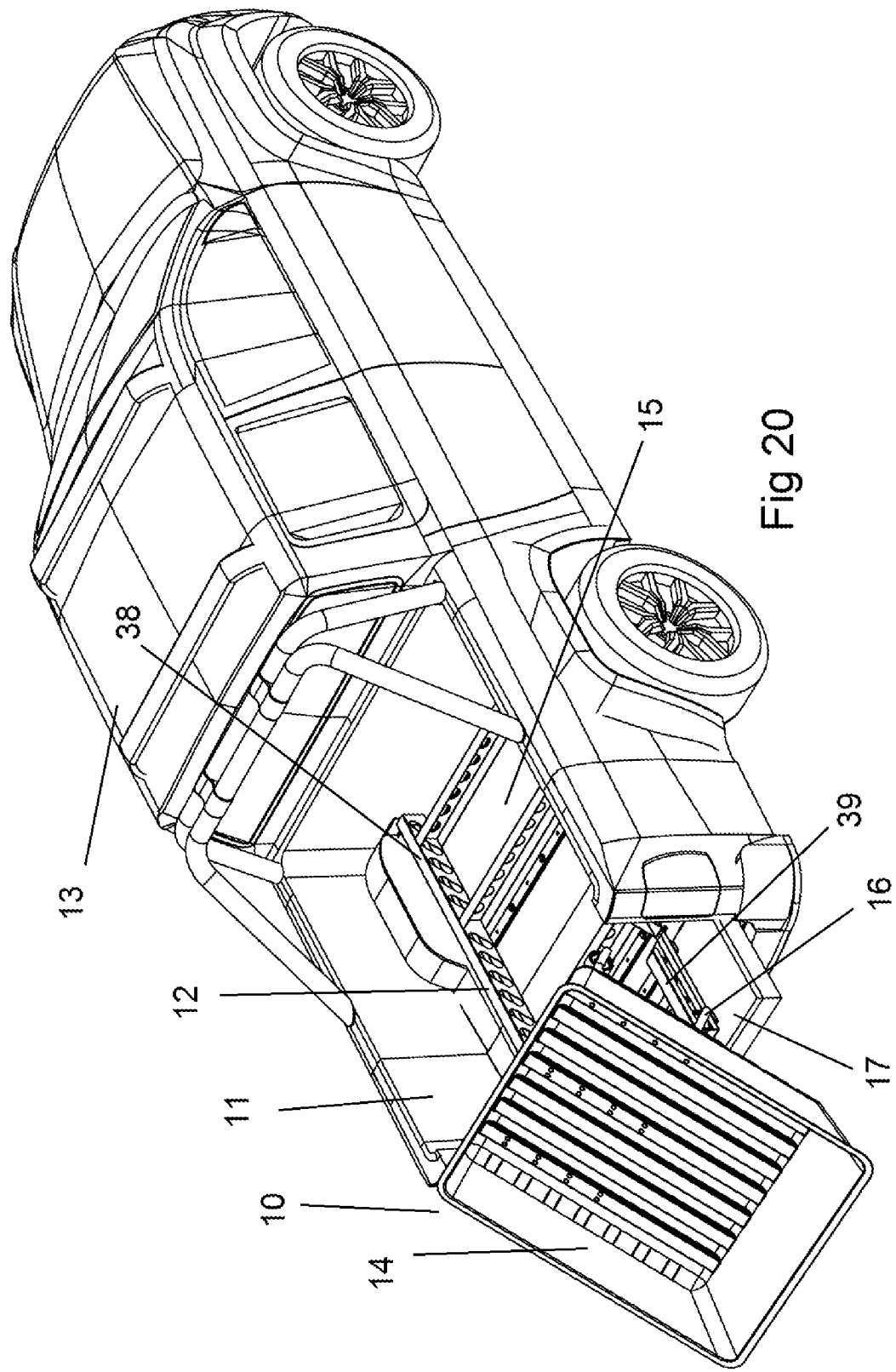

In use, the bucket system 10 may be mounted within the tray 11 of the vehicle 13 generally as shown in FIGS. 18 and 19. During transport, the rear portions 39 of the first and second side rails 26 and 27 are rotated to the stored position so that the tray door 17 may be closed. When it is required to unload the bucket 14, the tray door 17 is opened and the rear portions 39 pivoted to the extended positions, as shown in FIG. 19. The bucket 14 may then be slid rearwardly on the first and second rails 26 and 27 until the first and second front wheels 32 and 33 are adjacent the gaps 42 defined between the front and rear portions 38 and 39. The rear end of the bucket 14 may then tilt downwardly as the first and second front wheels 32 and 33 move upwardly and the material within the bucket may be emptied. The position of the bucket support 16 on the bucket 14 assists with rotation of the bucket 14 for tipping.

Figure 7:
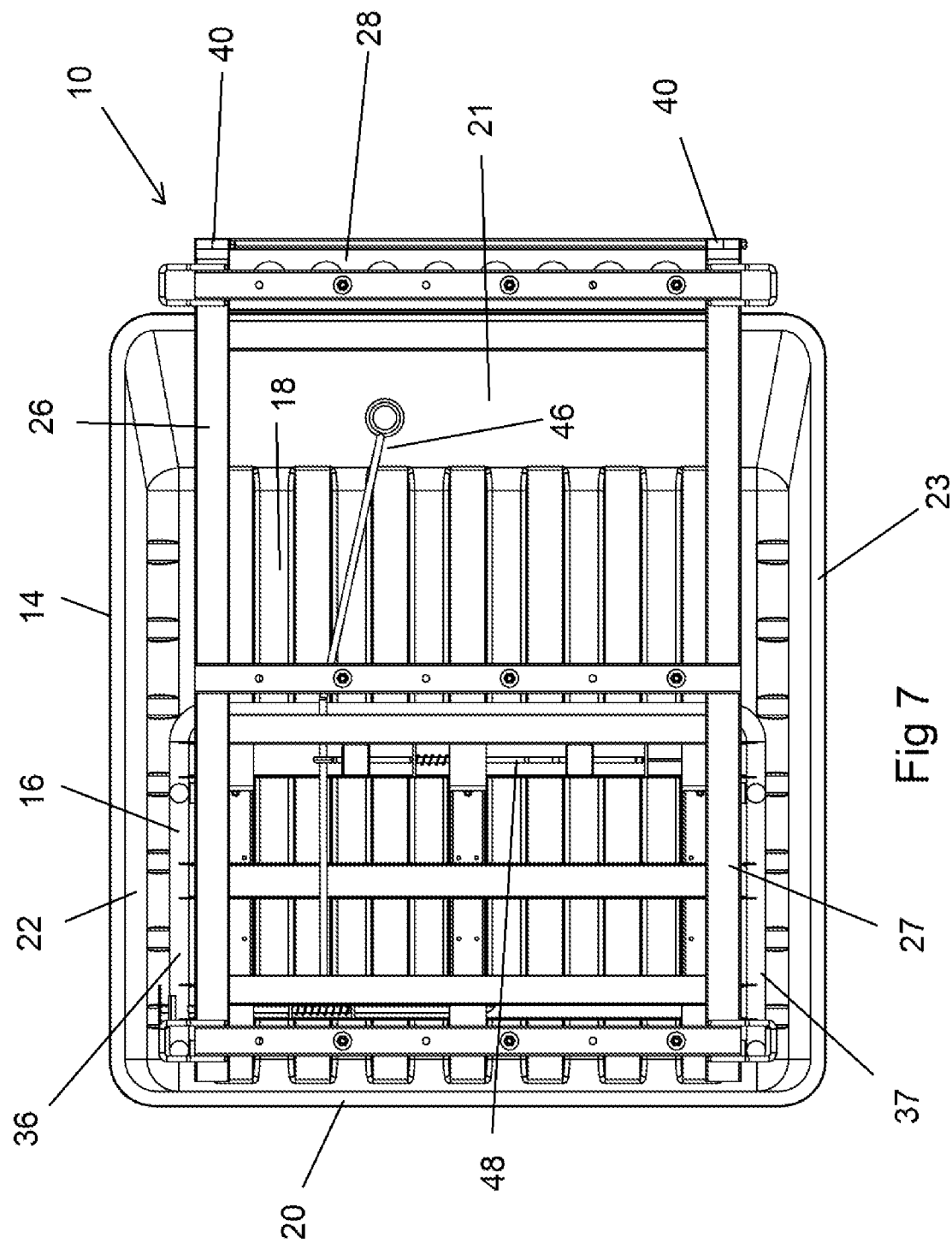
FIG. 7 is a bottom view of the bucket system of FIG. 1.

The bucket system 10 is provided also with a latch mechanism connecting between the bucket support 16 and the frame 12. The latch mechanism restricts movement of the bucket support 16 relative to the frame 12 to stop the bucket 14 from sliding along the rails 26 and 27 during transport. The latch mechanism includes an actuator 46 connected to a spring biased pin 48 (as best seen in FIG. 7) which engages into a hole on the frame 12. The actuator 46 can be moved sideways to disengage the pin 48 from the frame 12 when the bucket 14 is to slide outwardly towards the rear of the first and second rails 26 and 26. The actuator 46 comprises a rod 47 having a distal end which extends rearwardly of the support frame 16 so that the actuator 46 may be operated from someone standing behind the vehicle.

The bucket support 16 is also provided with resilient buffers adjacent the rear side thereof such that the buffers engage with the edge of the tray door 17 of the vehicle 11 when the bucket 14 is tipped to restrict further rotation of the bucket 14.

Figure 17:
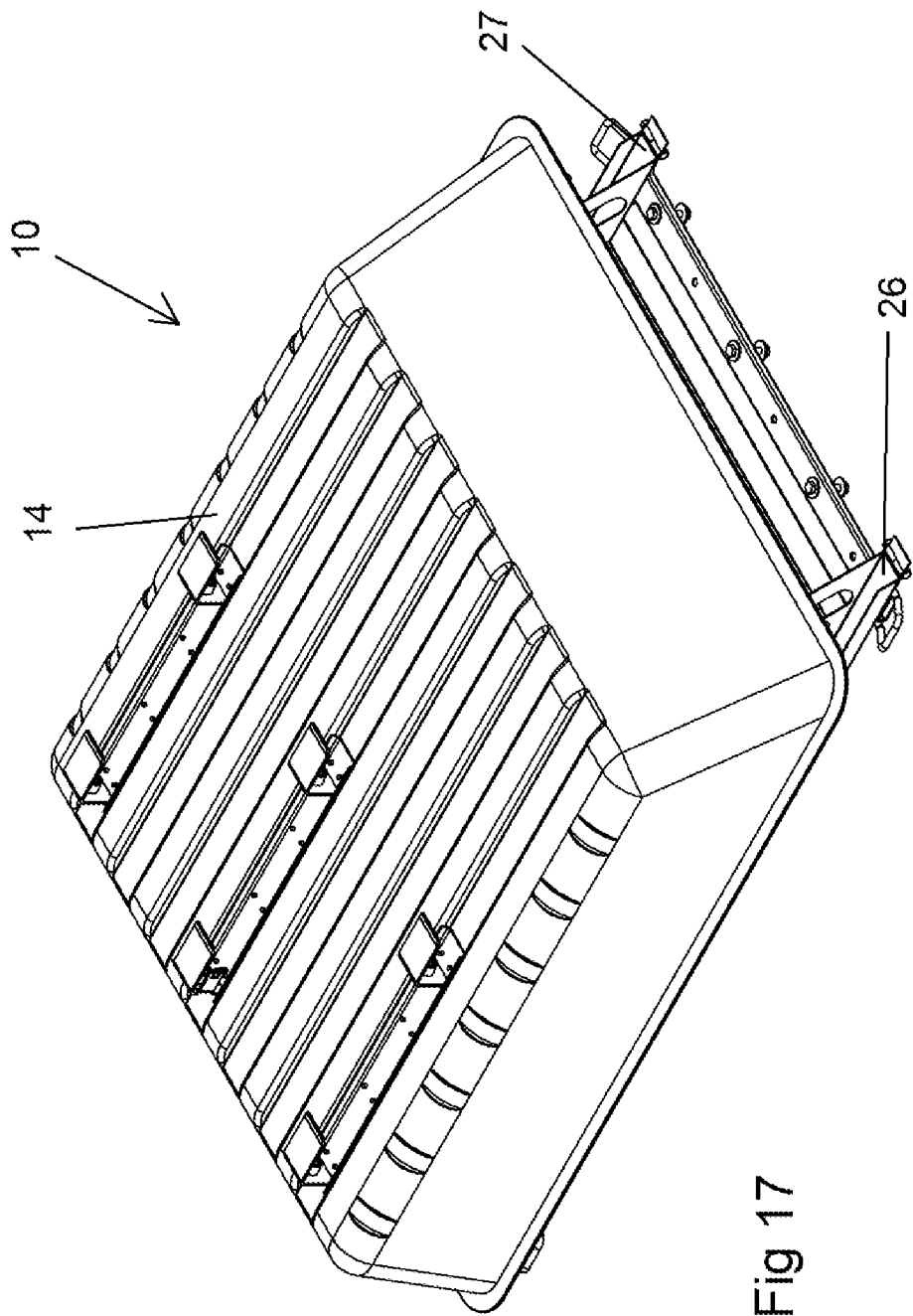
FIG. 17 is a lower perspective view of the bucket system showing the bucket in the stored position.

The components of the bucket system 10 may also be disconnected for storage purposes. The bucket 14, for example, may be disconnected from the bucket support 16 so that it may be placed upside down (as shown in FIGS. 17 and 18) on top of the components of the frame 12.

It will be readily apparent to persons skilled in the relevant arts that various modifications and improvements may be made to the foregoing embodiments, in addition to those already described, without departing from the basic inventive concepts of the present invention.

What is claimed is:

1. A bucket system comprising:
   a frame including first and second rails, the first and second rails each including a front portion and a rear portion, the front portions being secured relative to a floor of a tray of a vehicle and the rear portions being pivotable between an extended position, in which the rear portions are parallel to the front portions, and a stored position, in which the rear portions are perpendicular to the front portions; and
   a bucket having a bucket support, the bucket support including first and second front wheels and first and second rear wheels, the first front and rear wheels being slidable within a channel extending along the first rail and the second front and rear wheels being slidable within a channel extending along the second rail;
   wherein when the rear portions of the first and second rails are moved to the extended positions, a gap is defined in an upper side of each of the first and second channels such when the first and second rear wheels are moved into the first and second channels in the rear portions of the first and second rails, the first and second front wheels may move upwardly through the gaps to allow the bucket to pivot about the first and second rear wheels,
   wherein rear ends of the front portions and front ends of the rear portions of the first and second rails are angled such that the front ends of the rear portions engage with the rear ends of the front portions when the rear portions are in the stored position and define the gaps in the extended position.

2. The bucket system in accordance with claim 1, wherein the rear ends of front portions and front ends of the rear portions are angled at 45° such that the front ends of the rear portions engage with the rear ends of the front portions when the rear portions are in the stored position.

3. The bucket system in accordance with claim 1, wherein the front and rear portions of the side rails are connected together by hinges on lower sides thereof.

4. The bucket system in accordance with claim 3, wherein the channels are provided in outer sides of the first and second rails.

5. The bucket system in accordance with 1, wherein the first and second rails comprises C-shaped members such that the channels are provided in vertical sides of the first and second rails and upper and lower sides of the channels are closed such that the wheels may engage against inner surfaces of the upper and lower sides of the channels.

6. The bucket system in accordance with claim 1, wherein the channels in the first and second rails are closed at the rear ends.

7. The bucket system in accordance with claim 1, wherein the centre of gravity of the bucket is located rearwardly of the centre of the bucket support such that the bucket tends to tip rearwardly when the front wheels are located adjacent the gap.

8. The bucket system in accordance with claim 1, wherein the bucket comprises a wall and an edge wall extending upwardly from around the periphery of the base wall.

9. The bucket system in accordance with claim 8, wherein the base wall is rectangular in shape and the edge wall comprises front and rear walls and first and second side walls.

10. The bucket system in accordance with claim 9, wherein the first and second side walls and the front wall are perpendicular to the base wall and the rear wall is angled outwardly away from the base.

11. The bucket system in accordance with claim 9, wherein the bucket support includes a first side member located adjacent the first side wall and a second side member located adjacent the second side wall, the first side member including the first front and rear wheels and the second side member including the second front and rear wheels.

12. The bucket system in accordance with claim 11, wherein each of the first and second side members includes downturned end portions on which the wheels are mounted.

13. The bucket system in accordance with claim 12, wherein the first and second side members are mounted between a center of the bucket and the front wall.

14. The bucket system in accordance with claim 1, wherein a latch mechanism is provided to restrict sliding motion of the bucket support relative to the frame.

15. The bucket system in accordance with claim 14, wherein the latch mechanism includes an actuator provided to move a spring biased pin on the bucket support such that moving the actuator disengages the pin from the frame.

16. The bucket system in accordance with claim 15, wherein the actuator comprises a rod having a distal end which extends rearwardly of the support frame.

\* \* \* \* \*